Feb. 9, 1926.
W. RAMGE
TEAPOT COVER
Filed April 3, 1925
1,572,082
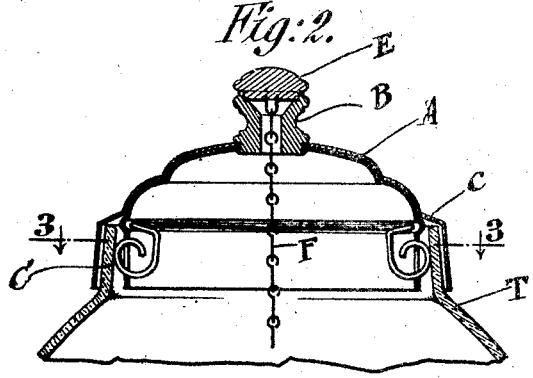
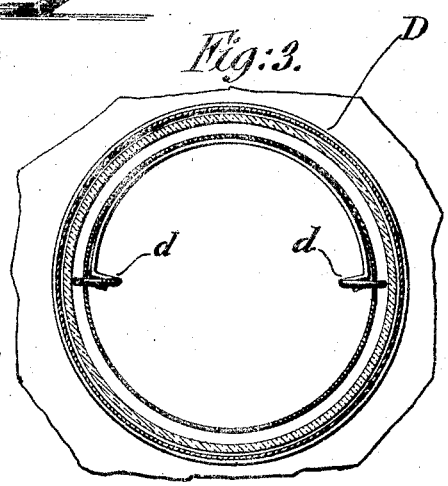
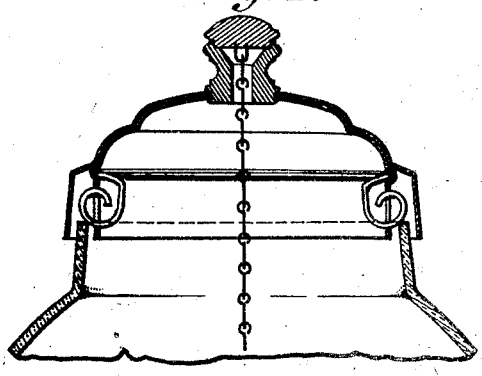
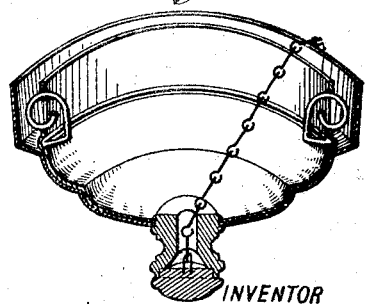
INVENTOR
BY
ATTORNEYS.

Patented Feb. 9, 1926.

1,572,082

UNITED STATES PATENT OFFICE.

WILLIAM RAMGE, OF BROOKLYN, NEW YORK, ASSIGNOR TO SIMON W. FARBER, INC., OF BROOKLYN, NEW YORK, A CORPORATION OF NEW YORK.

TEAPOT COVER.

Application filed April 3, 1925. Serial No. 20,542.

*To all whom it may concern:*

Be it known that I, WILLIAM RAMGE, a citizen of the United States, residing at Brooklyn, in the county of Kings, city and State of New York, have invented certain new and useful Improvements in Teapot Covers, of which the following is a specification.

This invention relates to covers for teapots. One of the objects thereof is to provide an improved cover for the teapots made of transparent glass (which are more fragile than ordinary teapots) and for which it has been necessary to devise a cover which will remain on the teapot regardless of the position in which the teapot is held.

Further objects of the invention are to provide a teapot cover of improved construction with cooperating means for brewing the tea.

Further objects of the invention will be apparent from the following specification and drawings, in which—

Figure 1 is a perspective view of my improved teapot cover in place on a teapot with a teaball attached to the cover.

Figure 2 is a vertical section showing the cover in place.

Figure 3 is a horizontal section along the line 3—3 of Figure 2.

Figure 4 is a vertical section showing the cover partially removed from the teapot, and Figure 5 is a sectional view of the cover, showing the retaining means.

The difficulty with the glass covers for glass teapots which are commonly made of what is known as "fireproof glass" is that glass covers have a very loose fit upon the top of the teapot and whenever the teapot is turned for pouring, the glass covers are apt to fall off and break.

Furthermore, unlike metal articles, glass teapots and covers therefor are apt to vary in size considerably and there is usually a loose close fit between a glass teapot and a glass or metal cover ordinarily sold therewith. Metal covers of the usual type have the disadvantage that they fit either too tightly or too loosely, since, when hot water is poured into glass teapots, the glass expands so that a considerable variation in size between the cover and teapot is produced at different temperatures. Furthermore, with the ordinary metal cover now in use, when a glass teapot expands and contracts, it is apt to crack owing to the contact with the metal cover, whose shape varies very little.

My improved cover obviates these objections as it will automatically provide for the contraction or expansion of the teapot itself and is in fact adapted to be used for various sizes of teapots.

Furthermore, my improved cover has the advantage of having both an inside and outside rim, so that when the steam arising from the hot water ascends and condenses on the cover, the drippings do not go to the outside of the teapot but remain inside and the outside of the teapot remains dry and clean.

A is my improved teapot cover having the central knob B and a double bottom or base of two concentric rings, namely an outer ring C and an inner ring C'. The spring D is inserted in a bead in the inner ring C', the construction of the spring D being more clearly shown in Figure 3. The ends $d$ of the spring D fit into openings in C' (see Figure 3) so that the ends of the spring D automatically press against the inwardly flaring tapered top of the teapot T. By means of spring D the cover is held in position in the teapot T regardless of contraction or expansion of the teapot. The cover is also thus adapted to be held in position in teapots whose sizes vary. A cap E is located in knob B and a teaball G is connected to knob B by a chain F. When the tea has been sufficiently steeped, the knob E may be lifted and the tea removed from the hot water.

As is apparent from Fig. 4, the ends $d$ of the spring D are resilient and they are forced inwardly when the cover is in final position. It is also clear from Fig. 2 that the outer rim has a diameter slightly greater than the outside of the top of the teapot, so that a cover made according to my invention may be used with teapots which vary in size, since the pressure of the ends of spring D is sufficient to hold the cover in position.

I have shown a preferred embodiment of my invention but it is clear that numerous changes and omissions could be made without departing from its spirit.

Having thus fully described my invention, what I claim is:—

1. A cover having two rims, the outer rim being located on the outside of the receptacle, the inner rim being located on the inside of the receptacle, and a spring attached to the inside of the cover and adapted to abut the top of the receptacle through holes in the inner rim.

2. A cover for a receptacle having an inwardly flaring top portion, the said cover having two rims, the outer rim being adapted to be located upon the outside of the top portion of the receptacle, said outer rim being of greater diameter than the top portion of said receptacle, and resilient means forming part of said cover and adapted to detachably hold said cover to the top of said receptacle.

3. A metal cover for receptacles having two rims adapted to cover the top of the receptacle, a spring attached to the inner rim and contacting with the inner face of the receptacle, said spring being attached to the inside of said cover and impinging on the inner face of said receptacle through holes in the inner rim of said cover.

4. A cover for receptacles having two rims, one located on the outside of the receptacle, the inner rim being located on the inside of the receptacle and retaining means on the inside of said cover, said retaining means acting on the top of the receptacle through holes in the inner rim.

In testimony whereof I affix my signature.

WILLIAM RAMGE.